(No Model.)  2 Sheets—Sheet 1.
J. R. LITTLE.
SAW TOOTH SETTING MACHINE.
No. 483,497. Patented Sept. 27, 1892.
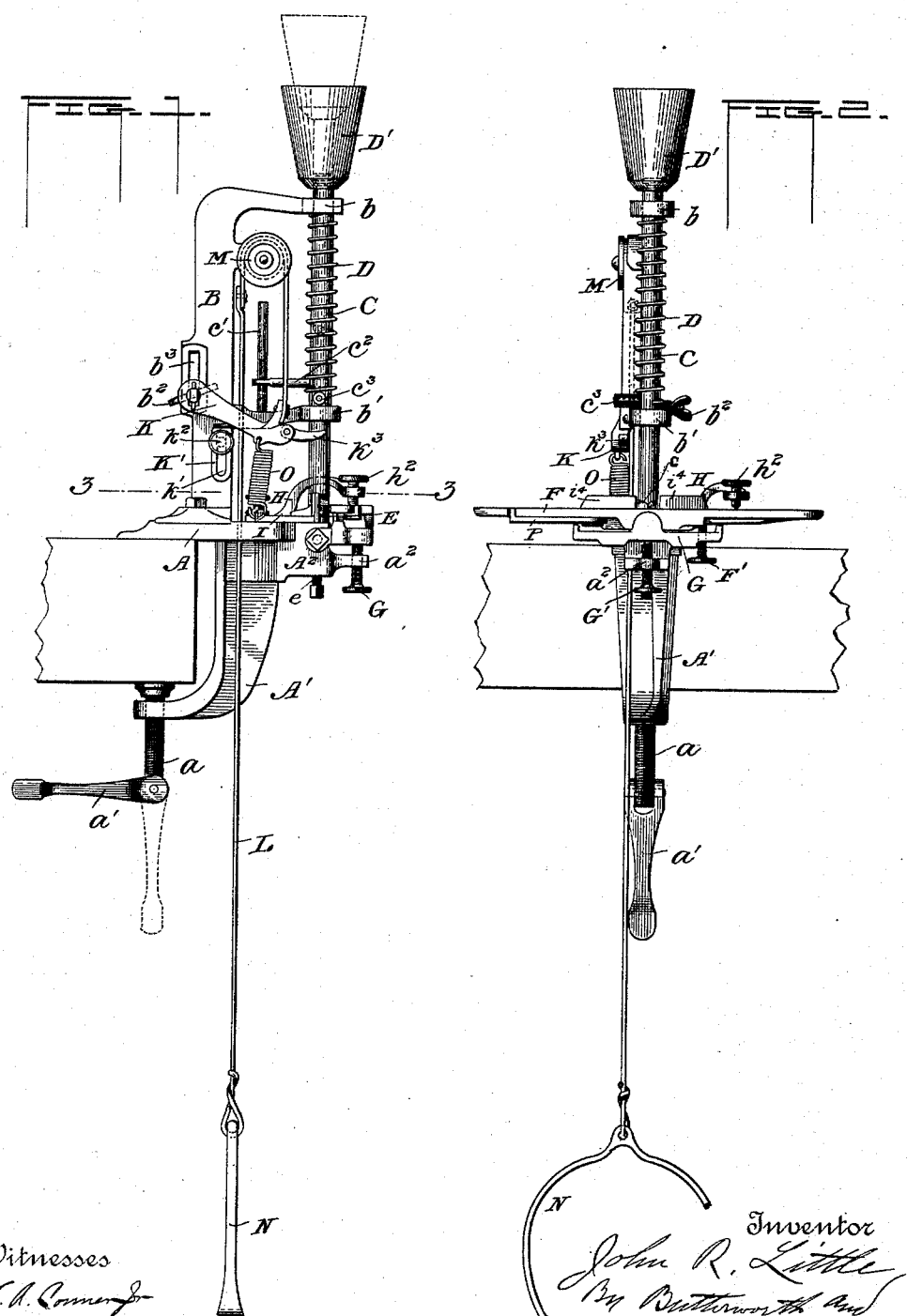

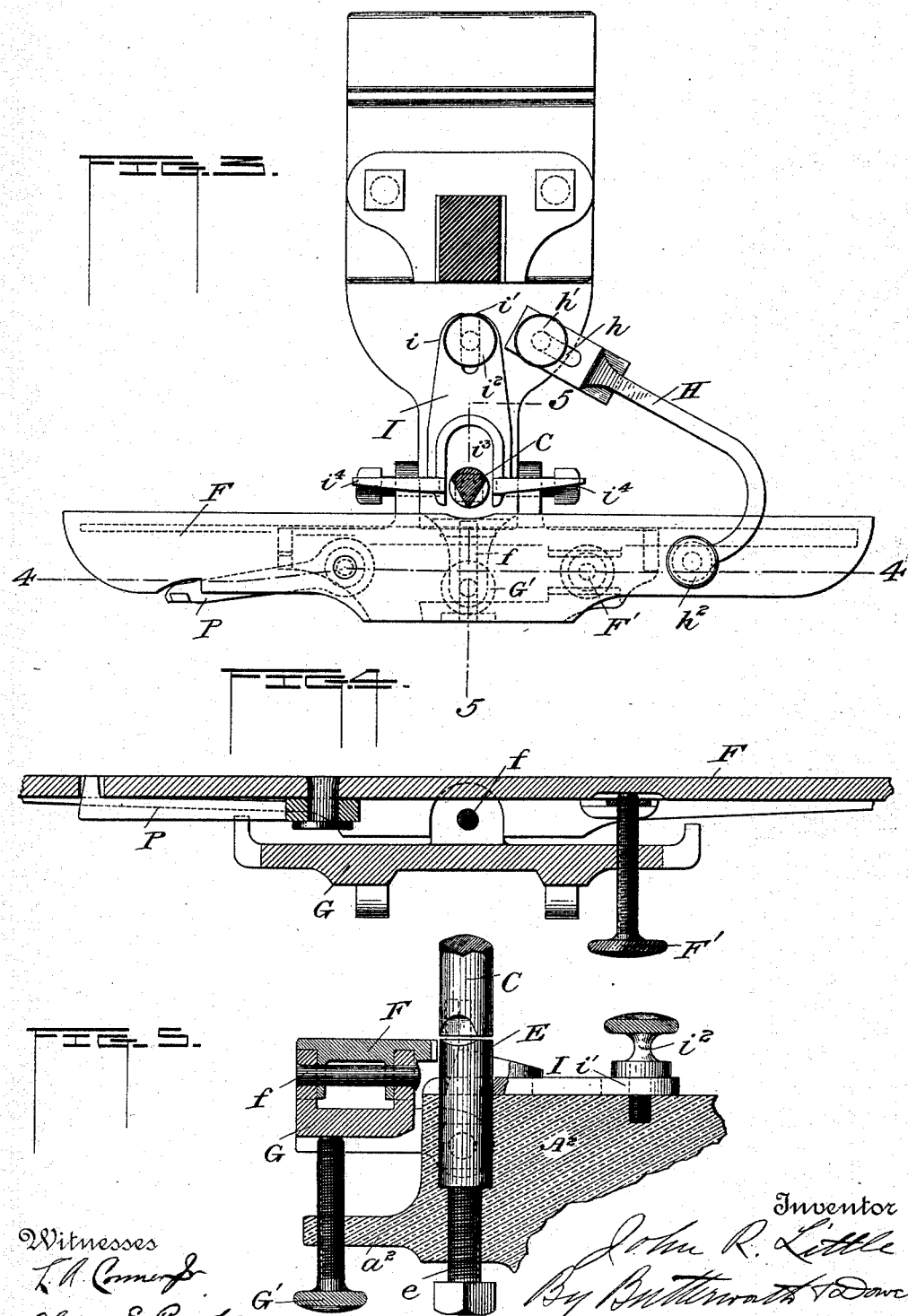

UNITED STATES PATENT OFFICE.

JOHN R. LITTLE, OF WEST STEWARTSTOWN, NEW HAMPSHIRE, ASSIGNOR OF ONE-HALF TO HENRY E. BELLEROSE, OF SAME PLACE.

SAW-TOOTH-SETTING MACHINE.

SPECIFICATION forming part of Letters Patent No. 483,497, dated September 27, 1892.

Application filed February 10, 1892. Serial No. 420,993. (No model.)

*To all whom it may concern:*

Be it known that I, JOHN R. LITTLE, a citizen of the United States, residing at West Stewartstown, in the county of Coos and State of New Hampshire, have invented certain new and useful Improvements in Saw-Tooth-Setting Machines; and I do hereby declare the following to be a full, clear, and exact description of the invention, such as will enable others skilled in the art to which it appertains to make and use the same.

My invention relates to saw-sets, and has special reference to that class of machines which are used to wrest or turn the teeth of saws alternately to the right and left, so that they may make a kerf somewhat wider than the thickness of the blade. It has been the common practice heretofore to swage or bend the teeth alternately to the right and left, thus causing the saw to cut a kerf considerably wider than the blade, and it has been found in practice in using saws with the teeth set in this manner that the saw, though never so nicely fitted, will still run to the right or left, owing to the fact that the back side of the tooth sets out past the cutting-edge, which must throw it to the opposite side. Furthermore, in using saws with teeth set in the usual manner, with only a single shear, if only one or two teeth are set out it greatly affects the running of the saw, making it difficult to cut true.

The object of my invention is to overcome these and other objections to saws in common use and at the same time to provide a saw-setting machine which shall be simple in construction, inexpensive in manufacture, and efficient and reliable in use.

The invention will first be described in connection with the accompanying drawings, and then particularly pointed out in the claims at the end of this description.

Referring to the drawings, in which similar letters of reference are used to designate corresponding parts of the machine, Figure 1 represents a side elevation of a machine embodying my invention. Fig. 2 is a front elevation of the same. Fig. 3 is a cross-section taken on line 3 3 of Fig. 1. Fig. 4 is a section taken on the line 4 4 of Fig. 3, and Fig. 5 is a section taken on the line 5 5 of Fig. 3.

A denotes a main frame-piece or base-plate, which is preferably formed integral with the depending portion or clamping-arm $A'$, which, together with the screw-threaded rod $a$, fitted in the lower screw-threaded end of the part $A'$, forms a clamp for securing the base-plate to the bench or other suitable support therefor.

$a'$ denotes a hand piece or lever, which is pivoted to screw-rod $a$, and when turned to the position shown in full lines affords a ready means for adjusting the clamp.

B denotes a standard or frame-piece, which is mounted upon the base-plate A and is provided with the arms $b\ b'$, which are apertured to receive and guide the plunger C.

D denotes a power-storing spring, which is fitted upon the plunger between the arms $b\ b'$. The upper end of the plunger C is screw-threaded, so that weights $D'$ of variable sizes may be fitted thereon, for a purpose to be described.

At its lower end the plunger C may be provided or formed integrally with a die or punch $c$, which is preferably in the form of an isosceles triangle, as indicated in sectional lines in Fig. 3. For general efficiency and simplicity of construction and cheapness of manufacture I use an ordinary round or circular plunger-rod formed integrally with the punch, and for the purpose of guiding this plunger in its reciprocating movements, so as to cause the punch $c$ to retain the proper position in respect to the saw-tooth, I provide a guide-rod $c'$, over which is fitted the apertured end of a slide $c^2$, projecting from the plunger C.

E denotes the anvil, which is adjustably fitted in a socket in the base-plate A and is rendered vertically adjustable by means of a set-screw $e$.

F denotes a bed-rest or table on which the saw to set is placed. The table F is pivoted centrally, as at $f$, to a bed-piece or support G, which latter is also hinged or pivoted to a projecting portion or head $A^2$ of the base-plate A, the pivot of the table F being arranged at about right angles to the hinge or pivot of the bed-piece G, so that when the said parts are rocked upon their respective pivots, with the saw-blade resting upon the table F, the saw will be canted or tilted both lengthwise and sidewise for a purpose to be described.

P denotes an arm pivotally secured to the under side of the table F and adapted to be pulled out to serve as a rest for the saw.

F' denotes a set-screw which may be seated in a screw-threaded aperture near the end of the hinged bed-piece or support G for the purpose of canting or rocking the table F upon its pivot.

G' denotes a set-screw which is preferably seated in a screw-threaded opening in an arm $a^2$, which projects from the head $A^2$ of the bedplate, whereby the support G may be rocked upon its pivot.

H denotes a presser foot or bar whose shank is slotted, as at $h$, to receive a thumb-screw $h'$, by which the presser-foot is adjustably secured to the base-plate A, as shown clearly in Fig. 3. The outer end of the bar H is provided with a thumb-screw $h^2$, which projects through a screw-threaded opening in the end of the presser-foot and is adapted to rest upon the saw-blade for the purpose of holding it down upon the table. By means of the thumb-screw $h'$ and slotted connection with the base-plate A the presser-foot H may be adjusted longitudinally and turned upon its pivot for the purpose of placing the thumb-screw $h^2$ in the desired position with reference to the saw-blade.

I denotes a gage, the arm $i$ of which is slotted, as at $i'$, to receive a thumb-screw $i^2$, by which the gage is adjustably secured to the base-plate A. The main portion or body of the gage is formed with an open-ended slot $i^3$, which is adapted to fit astride the anvil I, and with two laterally-projecting wings or guide-plates $i^4$ $i^4$ to serve as a guide in holding the teeth in the saw-blade in proper position upon the anvil to be struck by the die or punch $c$.

K denotes a trip-lever, which is adjustably secured to the standard B by means of a thumb-nut $b^2$, working in a slot $b^3$ in the standard, whereby the trip-lever may be adjusted up and down for the purpose of varying the stroke of the plunger C, permitting either a long or a short stroke at will.

K' denotes a stop, which is slotted at $k'$ and provided with a thumb-screw $k^2$, by which it may be adjustably secured to the frame-piece or standard B for the purpose of limiting the downward movement of the trip-lever, as may be desired.

L denotes a suitable cord or rope, one end of which is secured to the outer or free end of the trip-lever K, and it passes thence over a pulley M and down through an opening in the base-plate A to a treadle or stirrup N, which is adjustably secured to the lower end of the cord.

O denotes a spiral or other suitable spring connecting the base-plate and lever K and adapted to draw upon the lever when the latter has been elevated, so as to restore said lever and the treadle N to their normal positions.

$k^3$ denotes a pawl, which is pivoted to the outer end of the trip-lever K, so as to rest on a limiting stop or lug upon said lever, which prevents the pawl from dropping down, but permits it to rise when engaged on the under side thereof by the lug or friction-roll $c^3$ on the plunger, whereby the trip-lever is adapted to raise the plunger when the lever and pawl are raised, but to pass beneath the lug upon the plunger when the trip-lever descends.

The operation of the machine is as follows: The gage I and operating parts of the machine having been properly adjusted, as hereinbefore described, to adapt the several parts to the size of the saw and force of stroke desired to be exerted in setting the teeth, the saw is placed upon the table F beneath the presser-foot H, and by means of the screw F' the table is adjusted for the purpose of "canting" the saw lengthwise, so as to give the tooth what I term a "double shear." The hinged support G is also properly adjusted by means of the thumb-screw G', so as to give the proper set to the teeth. The saw-tooth having been properly placed on the anvil E, the treadle N is depressed by the foot of the operator, which causes the trip-lever K to rise, and as the pawl $k^3$ engages the stud $c^3$ the plunger C is elevated against the pressure of the spring D and the weight D' until the trip-lever is released by the roll or stud on the plunger, whereupon the latter will descend with a rapid stroke, striking the tooth and giving it the proper set. The saw is then moved along in the usual way, and this operation is repeated until all the teeth are properly set. By this method of setting the teeth I give to each tooth what I term a "double shear," setting the front edge of the tooth out and at the same time giving the tooth the usual set, except that this latter set is very slight, being all that is required when this double shear is given. By setting the teeth of the saw in this manner the saw will cut a third faster and hold its edge a third longer than when set according to the old methods, for the reason that the narrower the cut the less wood you have to remove and the faster the saw will cut. A further advantage of the double shear is that this extra shear stands out, so that a cutting-edge will be presented when the fleam-edge is considerably worn, whereas according to old methods of setting the very moment that the fleam-edge becomes worn to any extent the saw begins to crowd and destroy the set, thus necessitating frequent resetting. Moreover, the single-shear set requires such a wide kerf that the saw cuts roughly and slowly, and the latter set has also the disadvantage of causing the full-sized surface of the tooth to rub against the wood, thus increasing the friction, while with the double shear the cutting-edge only will touch, thus avoiding unnecessary friction. The narrow cut also wastes less timber in sawing.

It will be understood, of course, that various modifications may be made in the construction and arrangement of parts without departing from the spirit of my invention, and hence I do not desire to be limited to the exact construction shown and described. It is also apparent that the power-storing spring may or may not be used in conjunction with the auxiliary weights D', and other means may be employed for adjusting the hinged support and table or other parts of the machine instead of set or thumb screws; but I preferably use the described construction. It will also be understood that this method of wresting the teeth may be accomplished in a number of ways without necessarily employing a machine of any particular type, and the same result may be accomplished by hand, the saw-teeth being set with a hammer, by simply canting the saw-blade with the handle lowest and giving the tooth what I term a "double shear"—i. e., turning the front edge out and at the same time giving the tooth a slight lateral set.

One important feature of the clamping device resides in the fact that the machine may be fixed to a bench or other suitable support therefor without rendering it necessary to mutilate the bench by boring holes for the insertion of bolts or screws, and may be easily removed and adjusted in different positions.

Having thus described my invention, what I claim, and desire to secure by Letters Patent of the United States, is—

1. In a saw-set, the combination, with the base-plate, of the anvil, the reciprocating plunger, the longitudinally-rocking table, the transversely-rocking support on which said table is mounted, and means for actuating said plunger, substantially as described.

2. In combination with the hinged table-support, the table pivotally mounted upon said support, and means for rocking said support and table upon their respective pivots for the purpose of canting the one longitudinally and the other sidewise, substantially as described.

3. In combination with the base-plate having the projecting head with extension or arm thereon, the anvil, the plunger, the table-support hinged to said head, the adjusting-screw seated in said arm, the table pivotally mounted on said support, and the adjusting-screw arranged at one side of the pivotal center of the table, whereby said table-support and table may be rocked upon their respective pivots, so as to cant the saw-blade both lengthwise and sidewise, substantially as described.

4. In combination with the anvil and plunger, the hinged table-support, the table mounted upon said support and pivoted thereto, means for rocking said support and table upon their respective pivots in planes crossing each other, and means for actuating the plunger, substantially as described.

5. In a saw-set, the combination of the reciprocating spring-pressed plunger, the anvil, the trip-lever pivoted at one end and having a pivoted gravity-pawl at its free end adapted to engage a lug on said plunger, so as to raise the latter on the upstroke of the lever and to yield to said lug on the downward stroke, means for raising said trip-lever, and the spring for restoring the lever to normal position, substantially as described.

6. In combination with the reciprocating spring-pressed plunger, the trip-lever, the actuating-cord, and the adjustable stop for limiting the downward throw of the lever, substantially as described.

7. In combination with the hinged table-support, the longitudinally-rocking table mounted on said support, the anvil, the interchangeably-weighted reciprocating plunger and the power-storing spring, and means for actuating said plunger, substantially as described.

8. A saw-tooth-setting machine comprising the hinged table-support, the longitudinally-rocking table mounted on said support, means for adjusting and retaining said parts in the desired position, the anvil, the reciprocating spring-pressed plunger, the trip-lever, and means for actuating said lever and plunger, substantially as described.

9. In combination with the hinged table-support, the table pivotally mounted upon said support, and the laterally-swinging presser-foot adjustably secured to the base, substantially as described.

10. In combination with the saw rest or table, the hinged table-support on which said table is mounted, the vertically-adjustable anvil, the sliding gage having the bifurcated portion fitting astride said anvil and provided with the laterally-projecting wings or guide-plates, the reciprocating plunger, and means for actuating said plunger, substantially as described.

11. In a saw-set, the base-plate having the standard with laterally-extending apertured arms mounted thereon, the vertically-reciprocating plunger fitted to slide in said arms, the spring fitted on said plunger between said arms, the sliding arm fixed to said plunger, the guide-rod engaging an aperture in said arm, the trip-lever pivoted at one end to said standard and provided at its free end with a pivoted pawl adapted to engage a lug or pin on said plunger, so as to move the latter on the upward movement of the lever and to yield thereto on the reverse movement, and means for actuating said trip-lever, substantially as described.

12. A saw-set comprising the base-plate having the standard thereon provided with laterally-extending apertured arms in which is fitted a reciprocating plunger, the anvil secured to said base-plate in line with said plunger, the saw rest or table, the pivoted trip-lever carrying a gravity-pawl at its free end, adapted to engage and raise the plunger on the upstroke of the lever and to yield on the downward stroke, the fixed pulley or friction-roll, and the pulley-cord fitted over said pulley with one end attached to the free end of said trip-lever and provided with a treadle at the other end thereof, substantially as described.

13. In a saw-set, the base-plate provided with the anvil-socket, the integral standard having laterally-extending apertured arms adapted to receive the reciprocating plunger, and the depending clamping-arm having the screw-threaded aperture therein, in combination with the anvil, the plunger, the plunger-actuating mechanism, and the adjusting-screw engaging the aperture in said clamping-arm for securing and adjusting the machine upon a bench or other suitable support, substantially as described.

14. In a saw-set, the base-plate having the standard thereon provided with laterally-extending arms, the reciprocating plunger fitted in apertures of said arms, and means for actuating said plunger, in combination with the table-support pivoted to said base-plate and the table pivoted to said table-support, the pivots of said table and table-support being arranged at right angles to each other, and means for adjusting and securing said parts in the desired position, substantially as described.

15. In a saw-set, the combination, with the base-plate, of the table-support pivoted thereto, the adjusting-screw on which said support rests, the table mounted on said support and secured thereto by pivots arranged at right angles to the pivots of the table-support, and the adjusting-screw engaging a screw-threaded opening in said support and having a swiveled connection with said table, so as to adjust and retain said parts in fixed positions relatively to each other, substantially as described.

In testimony whereof I affix my signature in presence of two witnesses.

JOHN R. LITTLE.

Witnesses:
 C. H. HALL,
 B. J. TRASK.